(12) United States Patent
Foltz (10) Patent No.: US 11,488,281 B1
(45) Date of Patent: Nov. 1, 2022

(54) MULTICHANNEL INTERPOLATOR

(71) Applicant: Keysight Technologies, Inc., Santa Rosa, CA (US)

(72) Inventor: Garrett Foltz, Wilsonville, OR (US)

(73) Assignee: Keysight Technologies, Inc., Santa Rosa, CA (US)

( * ) Notice: Subject to any disclaimer, the term of this patent is extended or adjusted under 35 U.S.C. 154(b) by 81 days.

(21) Appl. No.: 17/169,686

(22) Filed: Feb. 8, 2021

(51) Int. Cl.
   *G06T 1/60* (2006.01)
   *G06F 17/17* (2006.01)

(52) U.S. Cl.
   CPC .............. *G06T 1/60* (2013.01); *G06F 17/17* (2013.01)

(58) Field of Classification Search
   CPC .................................. G06T 1/60; G06F 17/17
   USPC .......................................................... 345/522
   See application file for complete search history.

(56) References Cited

U.S. PATENT DOCUMENTS

| | | | |
|---|---|---|---|
| 5,925,841 A | 7/1999 | Rossum | |
| 9,858,636 B1 | 1/2018 | Lim et al. | |
| 10,489,478 B2 | 11/2019 | Lim et al. | |
| 10,606,918 B2 | 3/2020 | Lim et al. | |
| 10,747,843 B2 | 8/2020 | Lim et al. | |
| 2008/0034161 A1* | 2/2008 | Saveli ................ | H03H 17/0685 704/E21.001 |

FOREIGN PATENT DOCUMENTS

CN 109976660 A * 7/2019

* cited by examiner

*Primary Examiner* — Jennifer Mehmood
*Assistant Examiner* — Kim Thanh T Tran (57) ABSTRACT

A multichannel interpolator has an input that receives input data that consists of interleaved channel data from a plurality of data channels. A block random access memory (BRAM) stores data samples from the input data received from the input. Input control logic receives the data samples from the input and places the data samples into the BRAM. Interpolator logic interpolates the data samples to produce output data. The output data is interpolated at an interpolation ratio programmed by a user. The interpolator logic includes a phase generator that calculates a value indicating the interpolation ratio, and a fractional template block that provides a fractional template used to interpolate the data samples to produce the output data, the fraction template block selecting, based on the value calculated by the phase generator. The fractional template is used to interpolate the data samples to produce the output data. Output control logic accesses the BRAM to provide the interpolator logic with the data samples stored in the BRAM as the data samples are needed to interpolate the data samples to produce the output data.

20 Claims, 5 Drawing Sheets

MULTICHANNEL INTERPOLATOR

BACKGROUND

A signal generator generates electronic signals with set properties of amplitude, frequency and wave shape. The generated signals can be used as a stimulus for designing and testing electronic systems.

When generating a signal, interpolation can be used to increase the number of discrete digital waveform data samples. When a data stream includes multiple data channels, the interpolation is done separately for each data channel. A separate interpolator logic can be used for interpolation of each data channel. Alternatively, a single interpolator circuit can be used to interpolate multiple data channels within a data stream.

DETAILED DESCRIPTION

Figure 1:
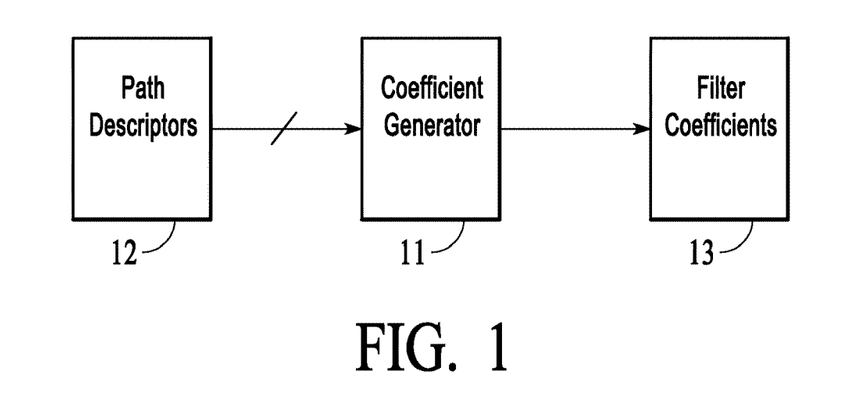
FIG. 1 shows a simplified overview of a coefficient generator.

FIG. 1 shows a simplified overview of a coefficient generator 11 that receives radio frequency (RF) channel path descriptors 12 for multiple data streams and produces filter coefficients 13 to be used for a frequency domain fast Fourier transform (FFT) filter. For example, the data streams may have differing data rates and coefficient generator 11 processes the data streams serially in a multiplexed fashion to reduce the amount of hardware necessary to process the multiple data streams.

Figure 2:
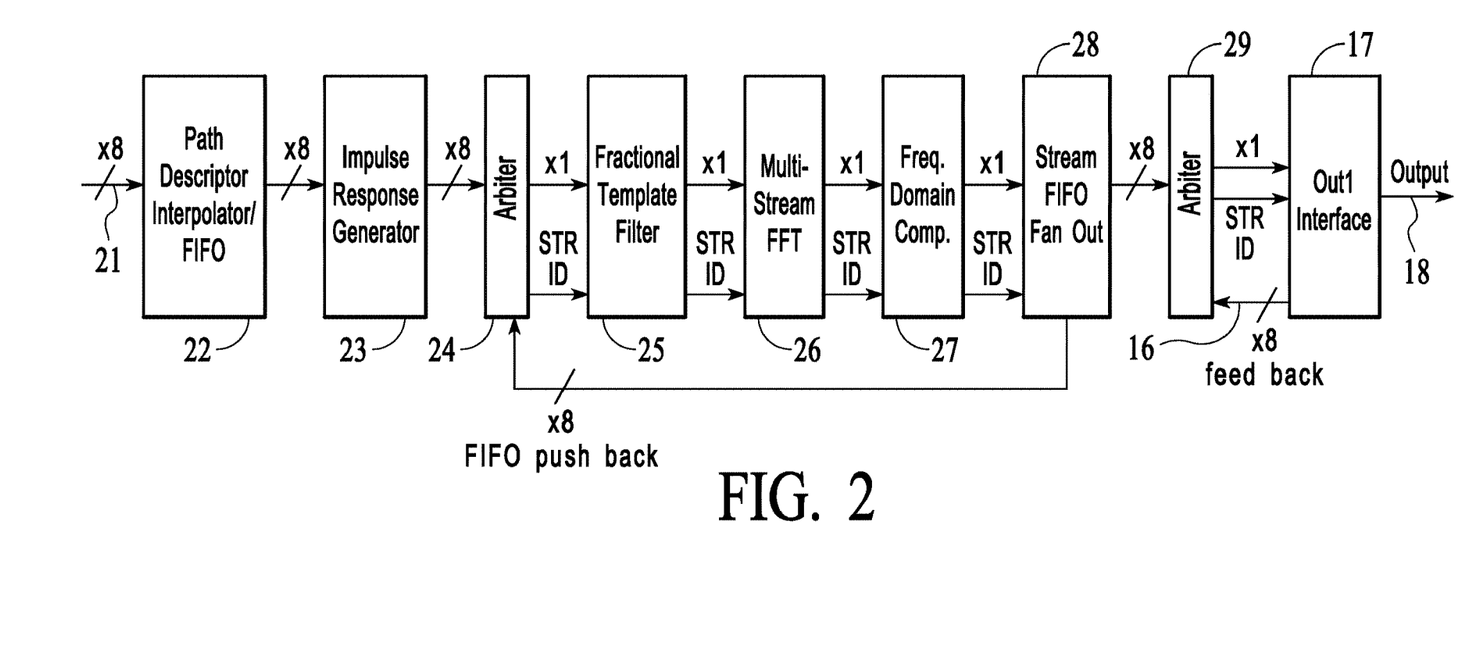
FIG. 2 shows a simplified signal flow block diagram for the coefficient generator shown in FIG. 1.

FIG. 2 shows a simplified signal flow block diagram for coefficient generator 11. An input 21 to a path descriptor/interpolator FIFO 22 consists of multiple ambidextrous data streams presented in parallel to coefficient generator 21. For example, in one embodiment there are up to eight ambidextrous data streams where single data packets are presented per clock cycle at each input stream. For example, data packet consists of a RF channel propagation descriptor having marker, gain, integer delay, and fractional delay that provide channel input responses (CIR) for a given RF channel emulation scenario. Groups of gain and delay pairs make up a single CIR. For example, the number of paths in a single CIR is programmable.

Path descriptor/interpolator FIFO 22 provides an interpolator stage at the input of each stream with separately controlled interpolation ratios. For example, each interpolator consists of a twenty-seven-tap fractional template filter which brings the interpolation image suppression on the order of 70 dB and the amplitude error around 0.025 dB.

For example, in a multi-cycle design, it takes twenty-seven clock cycles to compute a single gain/delay pair using this interpolator. This limits the coefficient output rate to the circuit clock rate divided by twenty-seven.

Impulse response generator 23 takes gain/delay pairs and creates a pseudo-impulse response data stream. That is, as indicated above, at input, a data packet consists of a marker, gain, integer delay, and fractional delay for a given propagation path (p). The marker m(p) is four bits of marker data. The gain g(p) is the complex gain of a path and has sixteen bits of signed data for each in-phase and quadrature components. The integer delay is an index integer that has fourteen bits of unsigned data. The fraction delay r(p) is a fractional index with ten bits of unsigned data. The number of bits of resolution between the integer and fractional delay bits is adjustable.

The index is the delay of the path normalized to the data sample rate. The fractional index is the remainder of the integer index normalization. Impulse response generator 23 takes these gain/delay pairs and creates a pseudo-impulse response data stream, according to Equation 1 below:

$$h_{pseudo\_CIR} = \Sigma_{p=0}^{P} G(p) \propto (n - i(p) - r(p))$$  Equation 1

It is a pseudo-impulse response because the fractional delay of the impulse is yet to be realized at this stage in the conversion. Essentially, impulse response generator 23 inserts zeros between the gain/delay pairs and passes the fractional delay with the data at the integer sample index. Realizing the fractional delay is performed by a fractional template filter 25.

Impulse response generator 23 knows the boundaries between sets of gain/delay samples and creates the appropriate impulse response based on data programmed into a FADING_NUM_PATHS register for each stream.

Impulse response generator 23 presents eight data streams in parallel to arbiter 24. Arbiter 24 controls the flow of the input data through fractional template filter 25 and on to frequency domain conversion stages which include a multi-stream fast Fourier transform (FFT) block 26 and a frequency domain compensation block 27. Fractional template filter 25, multi-stream fast Fourier transform (FFT) block 26 and frequency domain compensation block 27 together form frequency domain converter logic that transforms input signal samples of radio frequency (RF) signal impulse response data to frequency domain signal results, i.e., filter coefficients 13 to be used for a frequency domain fast Fourier transform (FFT) filter.

Arbiter 24 selects one data stream at a time to serially traverse through fractional template filter 25 and the frequency domain conversion stages. After the frequency domain conversion stages, the data stream fans out so that results for each data stream are placed into a dedicated post-FFT first-in-first-out (FIFO) memory within stream FIFO fan out block 28, where each data stream has its own dedicated post FFT FIFO.

FIFO fan out block 28 sends control signals back to arbiter 24 so that the dedicated post FFT FIFO for each data stream is kept at an adequate level as predetermined to allow efficient use of data streams as they are further processed after leaving coefficient generator 11. The data streams are time multiplexed and identified via a stream ID (STR ID). The depths and control thresholds for the dedicated post FFT FIFO are designed such that the latency through the template filter 25 and the frequency domain conversion stages can be accommodated without overflowing or underflowing the dedicated post FFT FIFO for each data stream.

Based on the control signals from FIFO fan out block 28, arbiter 24 selects which data stream is selected to forward to fractional template filter 25 so that all of the dedicated post FFT FIFOs are kept at their adequate level.

An arbiter 29 selects which data stream within FIFO fan out block 28 to place through to an output interface 17 which produces output 18 of coefficient generator 11. For example, output interface 17 uses control signals 16 to make requests for which data stream from within post-FFT FIFOs from FIFO fan out block 28 is to be selected by arbiter 29 to place through to output interface 17.

Fractional template filter 25 is an arbitrary time multiplexed filter with the ability to integrate multiple impulse responses on an integer index boundary. Fractional template filter uses a pseudo impulse response from an impulse response generation and a fractional delay to generate a fractional template filter and outputs time domain response for the multiple streams. Each sample of time domain response from fractional template filter includes a stream identifier which identifies the data stream for the sample.

Figure 3:
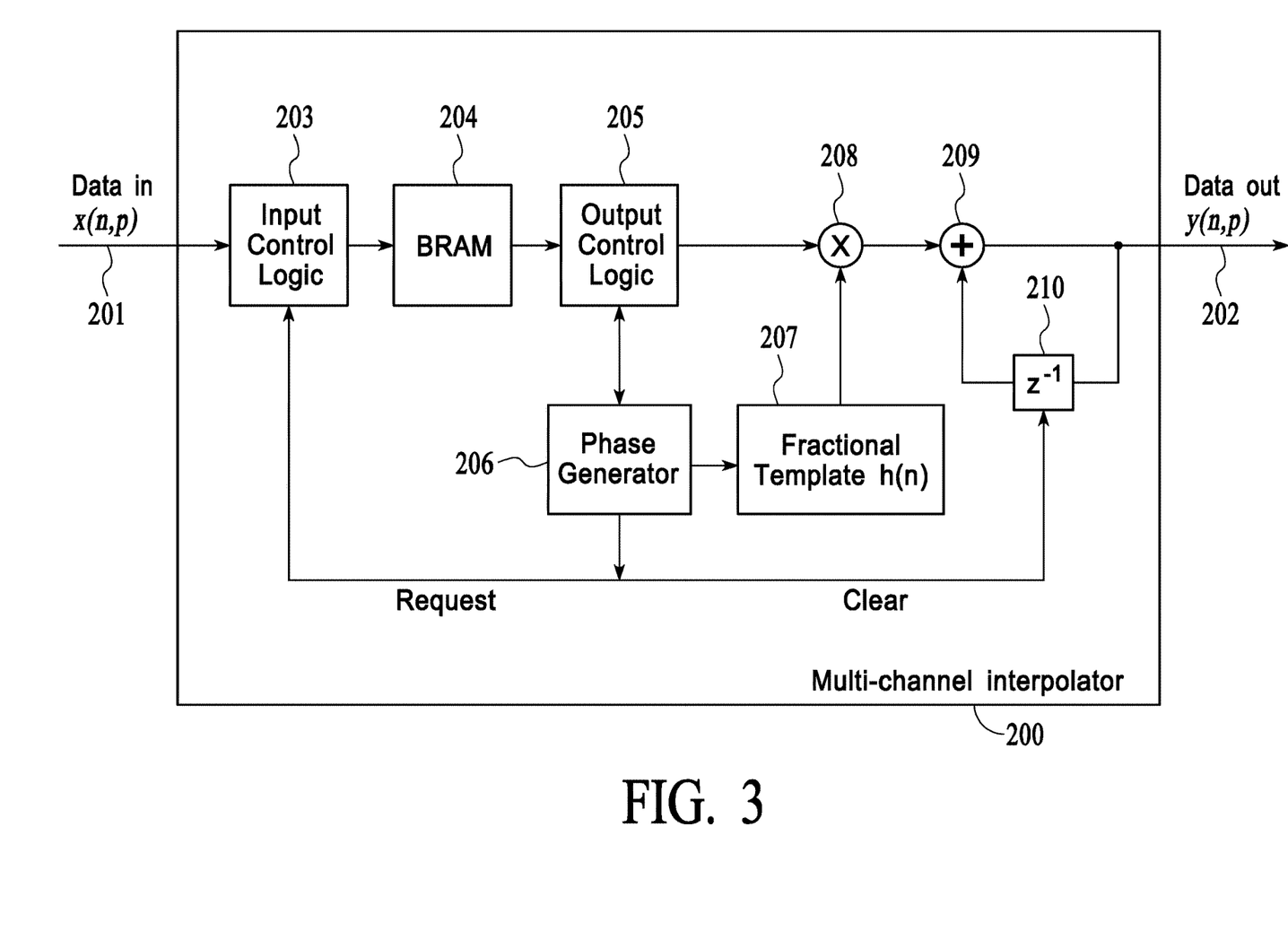
FIG. 3 shows a simplified block diagram of a multichannel interpolator within the coefficient generator shown in FIG. 1.

FIG. 3 shows a simplified block diagram of a multichannel interpolator 200 within path descriptor/interpolator FIFO 22 of coefficient generator 11. Multichannel interpolator 200 is used to interpolate one of the data streams of radio frequency (RF) channel path descriptors 12. The other data streams are interpolated by other interpolators within path descriptor/interpolator FIFO 22.

Data input 201 is represented by x (n,p) where x represents data in, n represents a sample number, and p represents the number of data channels interleaved within data input 201. For example, multichannel interpolator 200 allows up thirty-two (p 32) data channels to be interleaved.

Data output 202 is represented by y (n,p) where y represents data in, n represents a sample number, and p represents the number of data channels interleaved within data output 202.

In preparation for the interpolation, input control logic 203 sequentially loads interleaved data into a block random access memory (BRAM) 204. Interpolation logic consisting of a phase generator 206, a fractional template block 207, a multiplier, an adder 209 and a delay 210, performs the interpolation. Output control logic 205 accesses BRAM 204 to provide the interpolator logic with the data samples stored in BRAM 204 as the data samples are needed to perform the interpolation. The resulting interpolated data is placed on data output 202. The number of data channels within the interleaved data can be programmed, as further discussed below.

For each data channel p, the convolution relationship between input and output can be defined as in Equation 2 below:

$$y(n)=h(n)*x(n) \qquad \text{Equation 2}$$

where x(n) represents the input, y(n) represents the output and h(n) represents the impulse response for a sample n.

y(n)=h(n)*x(n) can be written as a series of dot product multiplications between vectors as in Equation 3 below:

$$y(n) = \begin{bmatrix} x(n) & x(n-1) & x(n-2) & \ldots \end{bmatrix} \begin{bmatrix} h(N-1) \\ h(N-2) \\ h(N-3) \\ \ldots \end{bmatrix} \qquad \text{Equation 3}$$

To perform the dot product multiplications, fractional template block 207 calculates templates for the impulse response h(n), output control logic 205 accesses the input values x(n) from BRAM 204 while multiplier 208, adder 209 and delay 210 provide the multiplication and accumulation of data to provide the data out y(n).

When there are p data channels, the convolution relationship between input and output can be defined as in Equation 4 below:

$$y_1(n)=h(n)*x_1(n)$$

$$y_2(n)=h(n)*x_2(n)$$

$$y_p(n)=h(n)*x_p(n) \qquad \text{Equation 4}$$

which can be written as a series of dot product multiplications between vectors as in Equation 5 below:

$$\begin{bmatrix} y_1(n) \\ y_2(n) \\ \ldots \\ y_p(n) \end{bmatrix} = \begin{bmatrix} [x_1(n) & x_1(n-1) & x_1(n-2) & \ldots ] \\ [x_2(n) & x_2(n-1) & x_2(n-2) & \ldots ] \\ \ldots \\ [x_p(n) & x_p(n-1) & x_p(n-2) & \ldots ] \end{bmatrix} \begin{bmatrix} h(N-1) \\ h(N-2) \\ h(N-3) \\ \ldots \end{bmatrix} \qquad \text{Equation 5}$$

Phase generator 206 is programmed with the desired interpolation ratio. For example, if the interpolation ratio is 2 to 1, multichannel interpolator 200 inserts interpolated data into the data stream so that there are two output data samples produced by multichannel interpolator 200 for every input data samples received by multichannel interpolator for each data channel. If the interpolation ratio is 3 to 1, multichannel interpolator 200 inserts interpolated data into the data stream so that there are three output data samples produced by multichannel interpolator 200 for every input data samples received by multichannel interpolator for each data channel. If the interpolation ratio is 5 to 4, multichannel interpolator 200 inserts interpolated data into the data stream so that there are five output data samples produced by multichannel interpolator 200 for every four input data samples received by multichannel interpolator for each data channel. And so on for any integer ratio for each data channel.

Input control logic 203 loads input data into BRAM 204. Output control logic 205 access data samples within BRAM 204 to forward to multiplier 208. The number of times a data sample stored in BRAM 204 is accessed and used to generate interpolation values is based on the selected values for interpolation ratio and the length of the fractional input response provided by fractional template block 207. Once a data sample stored in BRAM 204 is no longer needed, phase generator sends a request to input control logic 203 and input control logic 203 will overwrite the no longer needed data sample with a new data sample from data input 201.

The template h(n) utilized by fractional template block 207 depends on the interpolation ratio. Phase generator 206 informs fractional template block 207 of the selected fractional time sample index value to use in computing the interpolated data output.

While phase generator 206 is shown as a separate logic block, the function of phase generator 206 can be included within output control logic 205 for fractional template 207.

Figure 4:
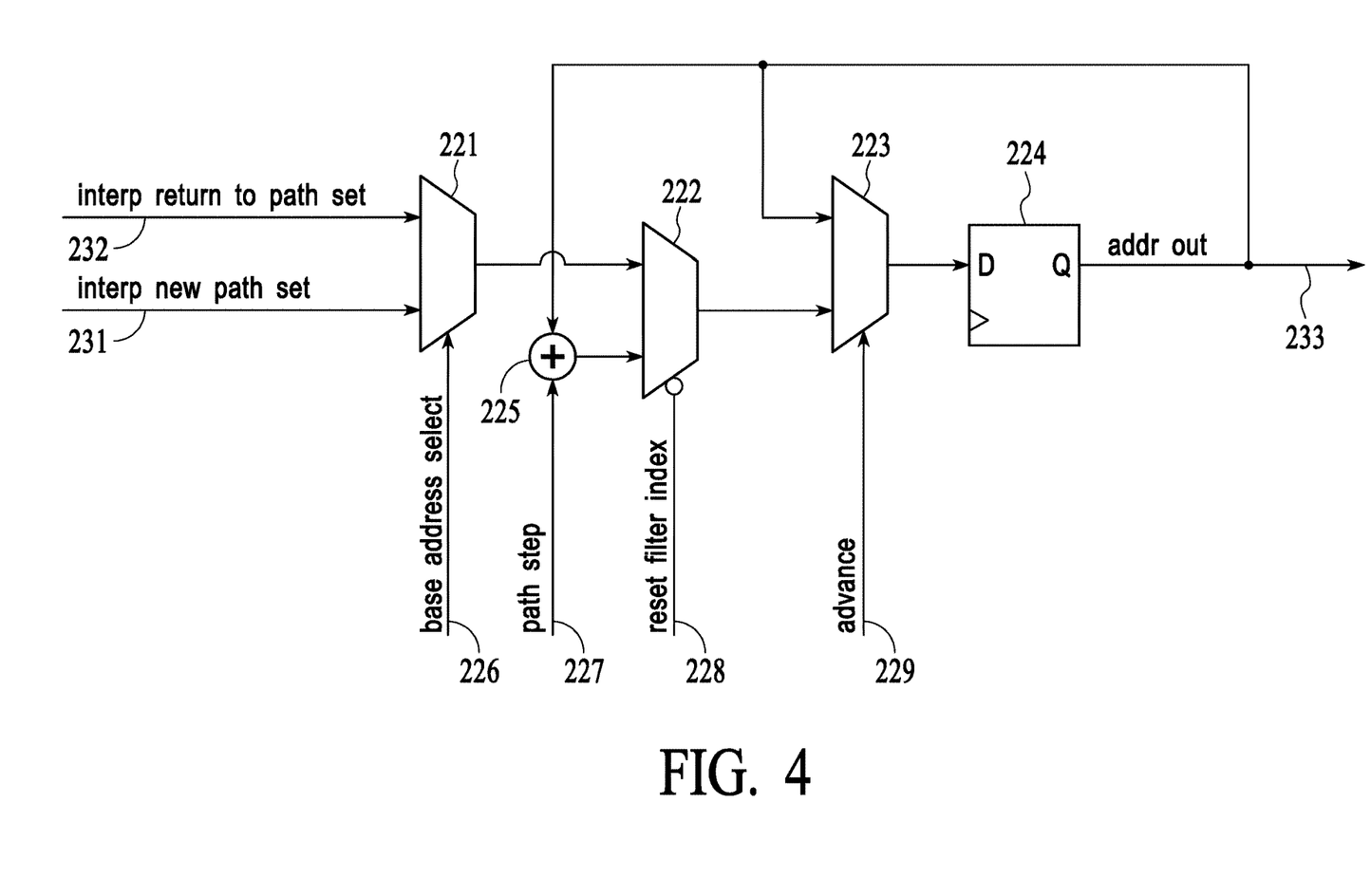
FIG. 4 shows a simplified block diagram control logic with the multichannel interpolator shown in FIG. 3.

To allow performance of the interleaved dot product multiplications described above, output control logic 205 has to, in correct order, access data from BRAM 204. FIG. 4 is a simplified block diagram of logic within output control logic 205 which controls the sequencing of the addresses to be accessed from BRAM 204. The BRAM address to be accessed is placed on an address output 233.

A flip-flop circuit (register) 224 holds the current address. A multiplexor (MUX) 223 holds the current address to the input of register 224 until an advance control signal on control input 229 of MUX 223 indicates a new address is to be accessed from BRAM 204. The new address is provided by multiplexor 222.

If the new address is the incremented value of the current address the new address is generated by an adder 225. Adder 225 increments the current address on address output 233 with a path step value placed on control input 227. The path step value placed on control input 227 is an amount of incrementation required to access the next address within BRAM 204 that stores a data sample for the current data channel.

The path step value is dependent upon the number of data channels. Where there is only a single data channel and no interleaving of data channel data, the path step value will be the next memory location in BRAM 204. When there are two data channels interleaved within BRAM 204, the path step value will be two memory locations forward in BRAM 204, as the next immediate memory location will be for a different data channel. When there are three data channels interleaved within BRAM 204, the path step value will be three memory locations forward in BRAM 204. And so on.

If the new address is not the incremented value of the current address, the reset filter index control input 228 will signal multiplexor 222 to forward the new address provided by multiplexor 221. Multiplexor 221 will select a new address based on base address select signal 226.

If the new address is to be the start address of a previously accessed set of interleaved data samples, base address select control signal 226 will cause multiplexor 221 to select an interpolator return to path set address 232 for the first data channel. This will be a saved return address of the first data channel in BRAM 204 and indicates output control logic 205 will again increment through memory locations of the BRAM 204 for each interleaved data channel starting from the first data channel at the return address to path set address 232.

If the new address is to be selected from another data channel, base address select control signal 226 will cause multiplexor 221 to select an interpolator new path set address 231 for the next data channel. This will be the start address for a full set interleaved of data samples for the next data channel. Output control logic 205 will then increment through memory locations in BRAM 204 for the next data channel. In this way each data channel is selected in circular fashion. Once the new path set address becomes the BRAM address placed on address output 233, the new path set address 231 is then updated to become a new path set address for an immediately following channel.

Also, once the phase generator 206 accumulates a fractional sample index over one, this indicates that the oldest values stored in BRAM 204 for the previous interleaved data channels are no longer needed. As a result, phase generator 206 will signal input control 203 to overwrite the oldest values stored in BRAM 204 for the previous data channels with new values from data input 201. In this way BRAM 204 is kept full and acts as a circular buffer. Alternatively, overwriting can take place when it is time to replace all the oldest values for every data channel, or at some other time.

Timing and values for advance control signal 229, reset filter index control signal 228, path step control signal 227 and base address control signal 226 are selected so that multichannel interpolator 200 produces an output in accordance with Equation 5 above. By programming input control logic 203, output control logic 205 and phase generator 206, a variable number of independent data sets can be changed programmatically without changing the digital logic footprint of multichannel interpolator 200.

While as described above, data samples travel through multichannel interpolator 200 serially, in alternative embodiments, to increase data flow, multiple data samples can flow in parallel through a multichannel interpolator.

Figure 5:
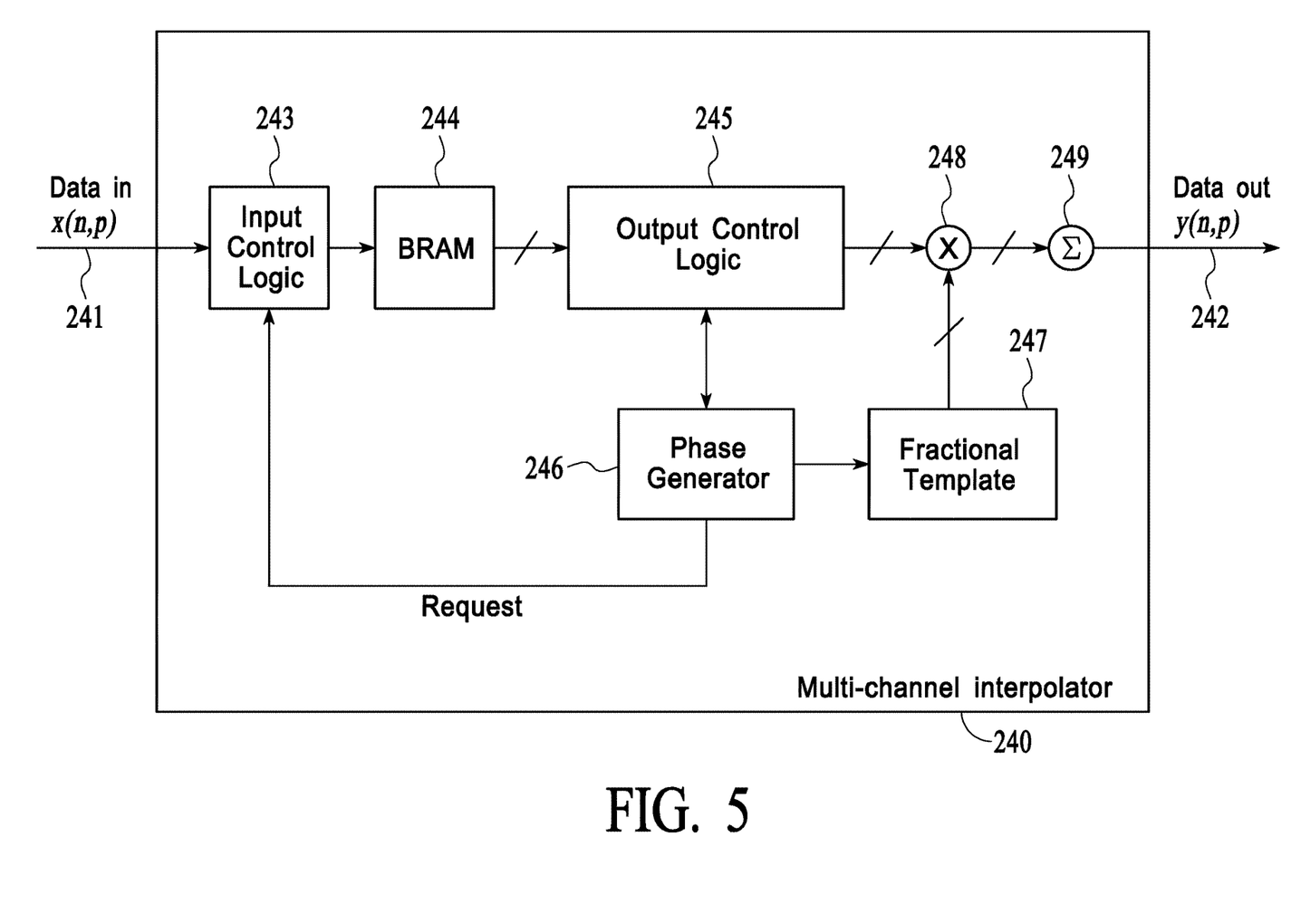
FIG. 5 shows a simplified block diagram of an alternative multichannel interpolator within the coefficient generator shown in FIG. 1.

For example, FIG. 5 shows a simplified block diagram of a multichannel interpolator 240. Data input 241 is represented by x (n,p) where x represents data in, n represents a sample number, and p represents the number of data channels interleaved within data input 241.

Data output 242 is represented by y (n,p) where y represents data in, n represents a sample number, and p represents the number of data channels interleaved within data output 242.

In preparation for the interpolation, input control logic 243 sequentially loads interleaved data into a block random access memory (BRAM) 244. Interpolation logic consisting of a phase generator 246, a fractional template block 247, a multiplier, a summation circuit 249 and a delay 210, performs the interpolation. Output control logic 245 accesses BRAM 244 to provide the interpolator logic with the data samples as needed to perform the interpolation. The resulting interpolated data is placed on data output 242. The number of data channels within the interleaved data can be programmed, as discussed above. Phase generator 246 is programmed with the desired interpolation ratio.

Input control logic 243 loads input data into BRAM 244. Output control logic 245 access data samples within BRAM 244 to forward to multiplier 248. The number of times data samples stored in BRAM 244 are accessed and used to generate interpolation values is based on the selected values for interpolation ratio and the length of the fractional input response provided by fractional template block 247. Once data samples stored in BRAM 244 are no longer needed, phase generator sends a request to input control logic 243 and input control logic 243 will overwrite the no longer needed data samples with new data samples from data input 241.

The template h(n) utilized by fractional template block 247 depends on the interpolation ratio. Phase generator 246 informs fractional template plate block 247 of the selected time sample index value to use in computing the interpolated data output.

While phase generator 246 is shown as a separate logic block, the function of phase generator 246 can be included within output control logic 245.

As shown in FIG. 5, to increase performance, parallel data flow is implemented from BRAM 244 to output control logic 245, from output control logic 245 to multiplier 248, from fractional template block 247 to multiplier 248 and from multiplier 248 to summation circuit 249.

Figure 6:
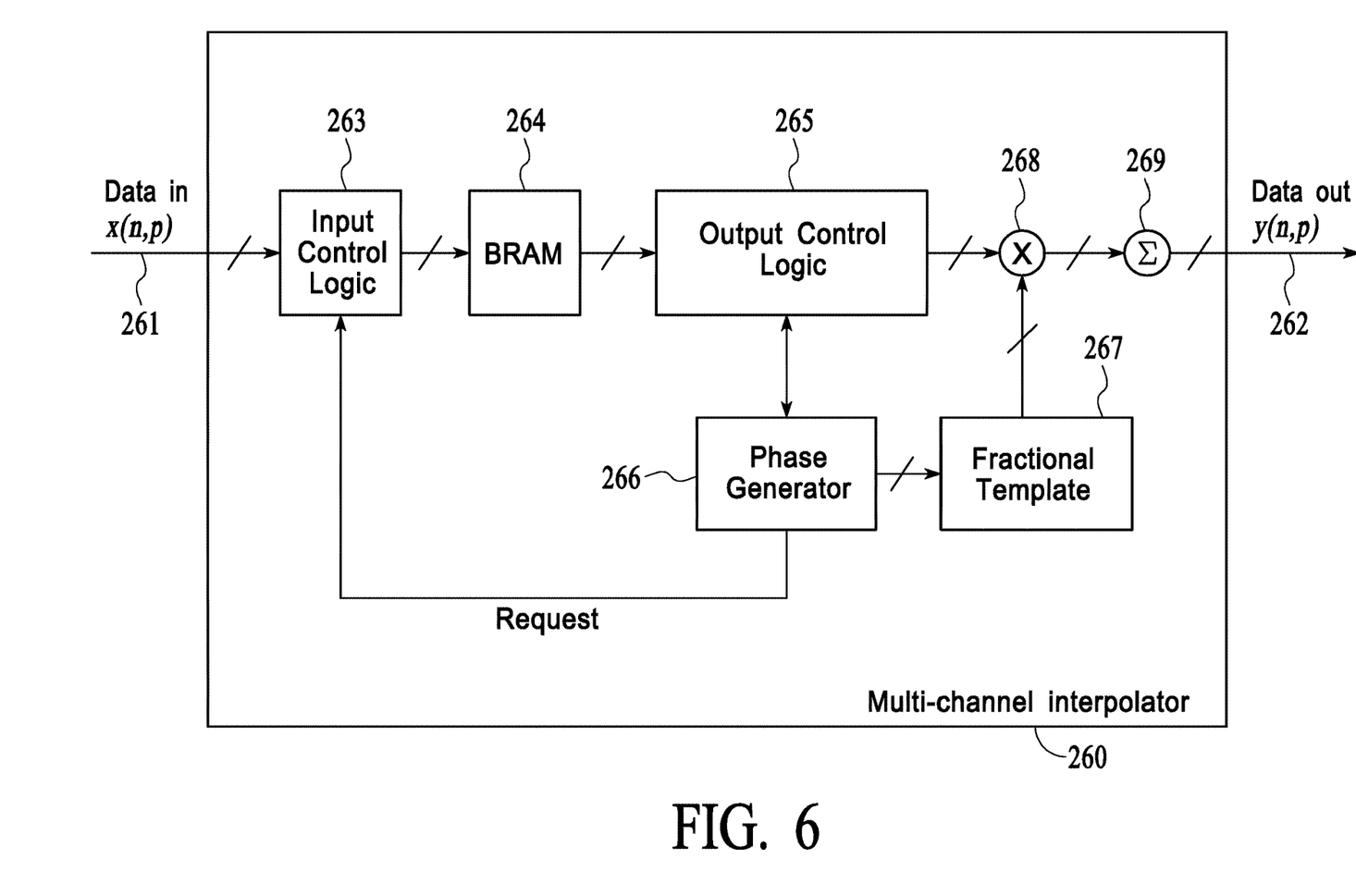
FIG. 6 shows a simplified block diagram of an alternative multichannel interpolator within the coefficient generator shown in FIG. 1.

Likewise, FIG. 6 shows a simplified block diagram of a multichannel interpolator 260. Data input 261 is represented by x (n,p) where x represents data in, n represents a sample number, and p represents the number of data channels interleaved within data input 261.

Data output 262 is represented by y (n,p) where y represents data in, n represents a sample number, and p represents the number of data channels interleaved within data output 262.

In preparation for the interpolation, input control logic 263 sequentially loads interleaved data into a block random access memory (BRAM) 264. Interpolation logic consisting of a phase generator 266, a fractional template block 267, a multiplier, a summation circuit 269 and a delay 210, performs the interpolation. Output control logic 265 accesses BRAM 264 to provide the interpolator logic with the data samples as needed to perform the interpolation. The resulting interpolated data is placed on data output 262. The number of data channels within the interleaved data can be programmed, as discussed above.

Phase generator 266 is programmed with the desired interpolation ratio.

Input control logic 263 loads input data into BRAM 264. Output control logic 265 access data samples within BRAM 264 to forward to multiplier 268. The number of times a data sample stored in BRAM 264 is accessed and used to generate interpolation values is based on the selected values for interpolation ratio and the length of the fractional input response provided by fractional template block 267. Once data samples stored in BRAM 264 are no longer needed, phase generator sends a request to input control logic 263 and input control logic 263 will overwrite the no longer needed data samples with new data samples from data input 261.

The template h(n) utilized by fractional template block 267 depends on the interpolation ratio. Phase generator 266 informs fractional template plate block 267 of the selected interpolation ratio.

While phase generator 266 is shown as a separate logic block, the function of phase generator 266 can be included within output control logic 265.

As shown in FIG. 6, to increase performance, parallel data flow is implemented from data input 261 to input control logic 263, from input control logic 263 to BRAM 264, from BRAM 264 to output control logic 265, from output control logic 265 to multiplier 268, from fractional template block 267 to multiplier 268, from multiplier 268 to summation circuit 269 and from summation circuit 269 to data output 262.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

What is claimed is:

1. A multichannel interpolator:
    an input that receives input data that consists of interleaved channel data from a plurality of data channels;
    a block random access memory (BRAM) which stores data samples from the input data received from the input;
    input control logic that receives the data samples from the input and places the data samples into the BRAM;
    interpolator logic that interpolates the data samples to produce output data, the output data being interpolated at an interpolation ratio programmed by a user, the interpolator logic including:
        a phase generator that stores a value indicating the interpolation ratio, and
        a fractional template block that provides a fractional template used to interpolate the data samples to produce the output data, the fraction template block selecting, based on the value calculated by the phase generator, the fractional template used to interpolate the data samples to produce the output data; and
    output control logic that accesses the BRAM to provide the interpolator logic with the data samples stored in the BRAM as the data samples are needed to interpolate the data samples to produce the output data.
2. A multichannel interpolator as in claim 1, wherein the phase generator provides feedback information to the input control logic indicating that more data samples from the input data can be placed into the BRAM.

3. A multichannel interpolator as in claim 1, wherein a user can programmatically select how many data channels are in the plurality of data channels.

4. A multichannel interpolator as in claim 1, wherein the output control logic obtains in parallel from the BRAM, multiple data samples.

5. A multichannel interpolator as in claim 4 wherein the interpolator logic multiplies and accumulates in parallel, multiple data samples.

6. A multichannel interpolator as in claim 1 wherein the interpolator logic multiplies and accumulates in parallel, multiple data samples.

7. A multichannel interpolator as in claim 1, wherein the input control logic receives in parallel, multiple data samples.

8. A multichannel interpolator as in claim 1, wherein the output control logic includes address selection logic that outputs a current access address for a current data channel used to access a data sample from the BRAM and that calculates a next access address, wherein the address selection logic includes:
    a first selector that selects as an output address from the first selector, one of the following:
        a return address for a first data channel in the plurality of data channels,
        a start address for a next set of data samples for a next selected data channel;
    a second selector that selects as an output address from the second selector, one of the following:
        the output address from the first selector, and
        an incremented address, the incremented address being the current access address plus an incrementation to an address for a next sample for the current data channel;
    a third selector that selects as an output address from the third selector, one of the following:
        the output address from the second selector, and
        the current address; and
    a register that holds the current address, an input to the register being the output address from the third selector.

9. A multichannel interpolator as in claim 8, control values for the first selector, the second selector and the third selector are chosen so that the output control logic that accesses the BRAM to provide the interpolator logic with the data samples stored in the BRAM as the data samples are needed to interpolate the data samples to produce the output data.

10. A multichannel interpolator as in claim 8, wherein a value for the incrementation is varies based on a number of data channels within the plurality of data channels.

11. A multichannel interpolator:
    an input that receives input data that consists of interleaved channel data from a plurality of data channels;
    a block random access memory (BRAM) which stores data samples from the input data received from the input;
    input control logic that receives the data samples from the input and places the data samples into the BRAM;
    interpolator logic that interpolates the data samples to produce output data; and
    output control logic that accesses the BRAM to provide the interpolator logic with the data samples stored in the BRAM as the data samples are needed to interpolate the data samples to produce the output data, wherein the output control logic includes address selection logic that outputs a current access address for a current data channel used to access a data sample from the BRAM and that calculates a next access address, wherein the address selection logic includes:
a first selector that selects as an output address from the first selector, one of the following:
   a return address for a first data channel in the plurality of data channels,
   a start address for a next set of data samples for a next selected data channel,
a second selector that selects as an output address from the second selector, one of the following:
   the output address from the first selector, and
   an incremented address, the incremented address being the current access address plus an incrementation to an address for a next sample for the current data channel,
a third selector that selects as an output address from the third selector, one of the following:
   the output address from the second selector, and
   the current address, and
a register that holds the current address, an input to the register being the output address from the third selector.

12. A multichannel interpolator as in claim 11, control values for the first selector, the second selector and the third selector are chosen so that the output control logic that accesses the BRAM to provide the interpolator logic with the data samples stored in the BRAM as the data samples are needed to interpolate the data samples to produce the output data.

13. A multichannel interpolator as in claim 11, wherein a value for the incrementation is varies based on a number of data channels within the plurality of data channels.

14. A multichannel interpolator as in claim 1, wherein the interpolator logic provides feedback information to the input control logic indicating that more data samples from the input data can be placed into the BRAM.

15. A multichannel interpolator as in claim 1, wherein a user can programmatically select how many data channels are in the plurality of data channels.

16. A multichannel interpolator as in claim 1, wherein the output control logic obtains in parallel from the BRAM, multiple data samples.

17. A multichannel interpolator as in claim 11, wherein the interpolator logic multiplies and accumulates in parallel multiple data samples.

18. A multichannel interpolator as in claim 11, wherein the input control logic receives in parallel multiple data samples.

19. Output control circuitry for a multichannel interpolator as in claim 11, the input control logic, comprising:
   includes address selection logic that outputs a current access address for a current data channel used to access a data sample from a BRAM and that calculates a next access address, wherein the address selection logic includes:
      a first selector that selects as an output address from the first selector, one of the following:
         a return address for a first data channel in the plurality of data channels,
         a start address for a next set of data samples for a next selected data channel;
      a second selector that selects as an output address from the second selector, one of the following:
         the output address from the first selector, and
         an incremented address, the incremented address being the current access address plus an incrementation to an address for a next sample for the current data channel;
      a third selector that selects as an output address from the third selector, one of the following:
         the output address from the second selector, and
         the current address; and
      a register that holds the current address, an input to the register being the output address from the third selector;
   wherein control values for the first selector, the second selector and the third selector are chosen so that the output control logic that accesses the BRAM to provide interpolator logic with the data samples stored in the BRAM as the data samples are needed to interpolate the data samples to produce interpolated output data.

20. Output control circuitry as in claim 19, wherein a value for the incrementation is varied based on a number of data channels within the plurality of data channels.

* * * * *